United States Patent
Kirkovich et al.

(10) Patent No.: US 11,653,059 B2
(45) Date of Patent: May 16, 2023

(54) CONTENT PRESENTATION CONTROL

(71) Applicant: Comcast Cable Communications, LLC, Philadelphia, PA (US)

(72) Inventors: Jonathan Kirkovich, Centennial, CO (US); John Bieberly, Centennial, CO (US); Nicholas Mandato, Centennial, CO (US); Christopher Weaver, Littleton, CO (US); James Rupert, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/148,916

(22) Filed: Jan. 14, 2021

(65) Prior Publication Data
US 2022/0224967 A1  Jul. 14, 2022

(51) Int. Cl.
| | | |
|---|---|---|
| H04N 21/439 | (2011.01) | |
| G06F 40/279 | (2020.01) | |
| H04N 21/485 | (2011.01) | |
| H04N 21/435 | (2011.01) | |
| G06F 3/16 | (2006.01) | |

(52) U.S. Cl.
CPC .......... *H04N 21/439* (2013.01); *G06F 3/165* (2013.01); *G06F 40/279* (2020.01); *H04N 21/435* (2013.01); *H04N 21/4852* (2013.01)

(58) Field of Classification Search
None
See application file for complete search history.

(56) References Cited

U.S. PATENT DOCUMENTS

| | | | |
|---|---|---|---|
| 8,893,169 B2 | 11/2014 | Klappert et al. | |
| 2005/0022229 A1* | 1/2005 | Gabriel | H04N 21/4532 725/136 |
| 2015/0070516 A1 | 3/2015 | Shoemake et al. | |
| 2015/0121178 A1* | 4/2015 | Karmarkar | H04K 3/45 715/201 |
| 2016/0119713 A1 | 4/2016 | Knox et al. | |
| (Continued) | | | |

OTHER PUBLICATIONS

WiTrack Sep. 11, 2020—Through-Wall 3D Tracking Using Body Radio Reflections.
(Continued)

*Primary Examiner* — James R Marandi
(74) *Attorney, Agent, or Firm* — Banner & Witcoff, Ltd.

(57) ABSTRACT

Systems, apparatuses, and methods are described for preventing and/or discouraging access by children and/or other persons to restricted content and/or other information. Some users may have different hearing and may be able to hear sounds at different, for example higher, frequencies than other users. Users may also wish to discourage and/or prevent other users from consuming restricted content. A sound output at a high frequency may be used to disrupt the viewing experience of a user that is not permitted to consume restricted content. The high frequency sound may cause the user that is not permitted to consume restricted content to leave an environment where the content item is output. The high frequency sound may be inaudible to users that are permitted to consume restricted content. The high-frequency sound may discourage and/or prevent some users from consuming restricted content without disrupting the user experience of other users.

21 Claims, 11 Drawing Sheets

| Deterrent Audio Configuration Settings | |
|---|---|
| User 905 | Holly |
| Enable Deterrent Audio 910 | ✓ |
| Violence 915 | ☐ |
| Sexual Content 920 | ✓ |
| Language 925 | ✓ |
| Rating 930 | PG-13 or higher |
| Services/Channels 935 | Service A, Service B, Service M |

(56) References Cited

U.S. PATENT DOCUMENTS

2018/0197532 A1     7/2018   Rajendran et al.
2022/0070526 A1*   3/2022   Aithal .............. H04N 21/23614

OTHER PUBLICATIONS

Medical News Today; Aug. 25, 2020; Body temperature: Normal ranges in adults and children; https://www.medicalnewstoday.com/articles/323819#normal-body-temperature-chart.

* cited by examiner

Deterrent Audio Configuration Settings

| | |
|---|---|
| User 905 | Holly |
| Enable Deterrent Audio 910 |  |
| Violence 915 |  |
| Sexual Content 920 |  |
| Language 925 |  |
| Rating 930 | PG-13 or higher |
| Services/Channels 935 | Service A, Service B, Service M |

Deterrent Audio Configuration Settings

| | |
|---|---|
| User 905 | Holly |
| Enable Deterrent Audio 910 |  |

Deterrent Audio Schedule 940

| | |
|---|---|
| Monday-Friday | Before 7pm |
| Saturday-Sunday | Between 9am and 7pm |

Deterrent Audio Configuration Settings

User
905

Holly

Frequency
945

CONTENT PRESENTATION CONTROL

BACKGROUND

Children may be prevented from consuming mature content by removing or blocking the mature content from a content item. Portions of video with mature content may be removed or obscured and inappropriate language may be replaced with other sounds. Although often effective to prevent children from consuming certain types of content, these methods may prevent access to mature content by persons for whom that mature content may be more appropriate.

SUMMARY

The following summary presents a simplified summary of certain features. The summary is not an extensive overview and is not intended to identify key or critical elements.

Systems, apparatuses, and methods are described for preventing and/or discouraging access by children and/or other persons to restricted content and/or other information. Different users may be able to hear sounds at different frequencies. Some users may have different and/or better hearing and may be able to hear sounds at different frequencies, for example higher frequencies, than other users. Users may also wish to discourage and/or prevent other users from consuming restricted content without disrupting the experience of users that may be permitted to consume the restricted content. A sound output at a high frequency, for example, may be used to disrupt the viewing experience of a user that is not permitted to consume restricted content. The high frequency sound may cause the user that is not permitted to consume restricted content to leave an environment where the content item is output. The high frequency sound may be inaudible to users that are permitted to consume restricted content. The high-frequency sound may discourage and/or prevent some users from consuming restricted content without disrupting the user experience of other users.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIGS. 9A-9C show example user interfaces for configuring deterrent audio.

DETAILED DESCRIPTION

Figure 1:
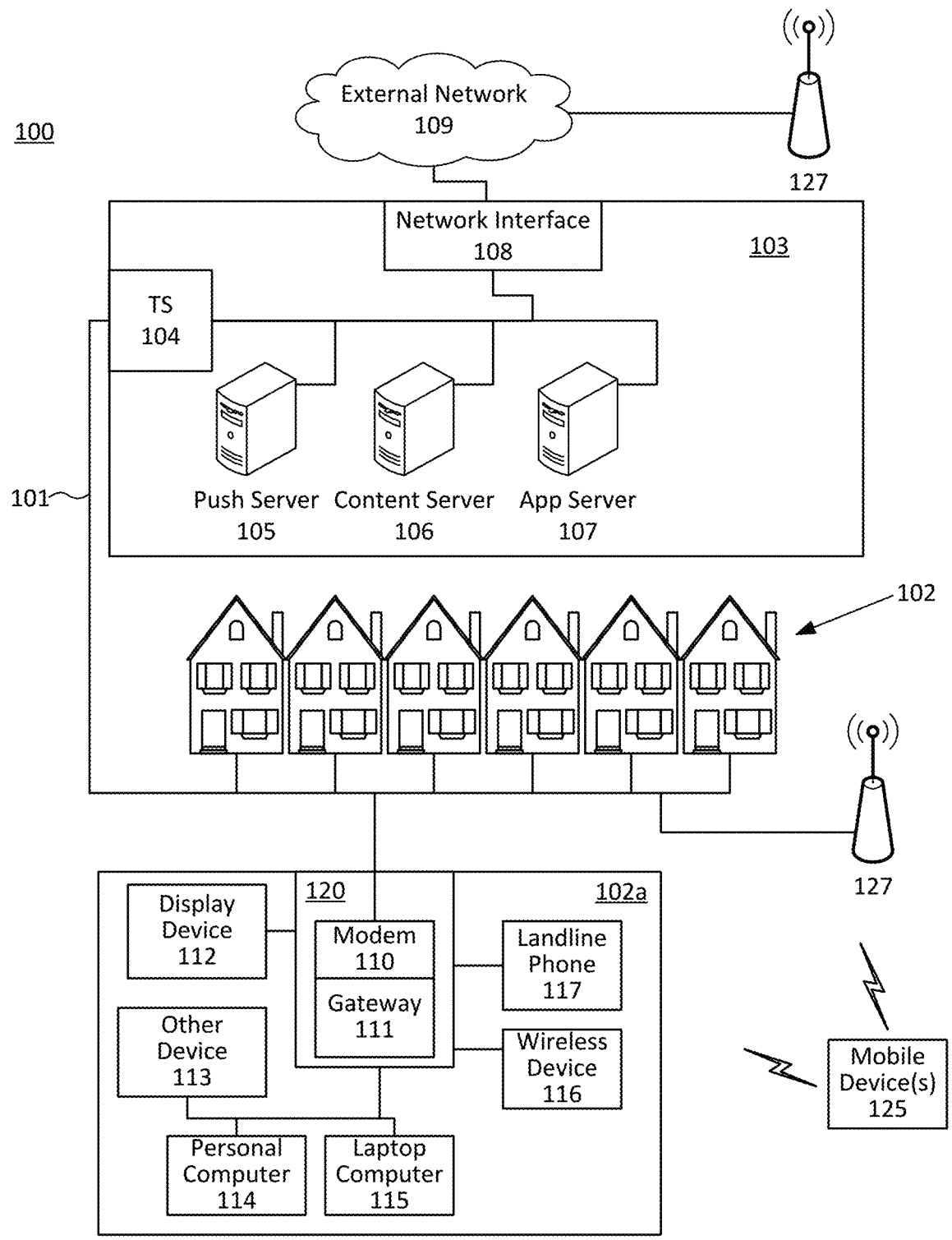
FIG. 1 shows an example communication network.

The accompanying drawings, which form a part hereof, show examples of the disclosure.

It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing device(s) configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional push, content, and/or application servers, and/or other types of servers. Although shown separately, the push server 105, the content server 106, the application server 107, and/or other server(s) may be combined. The servers 105, 106, 107, and/or other servers, which may also or alternatively be located in the external network 109, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
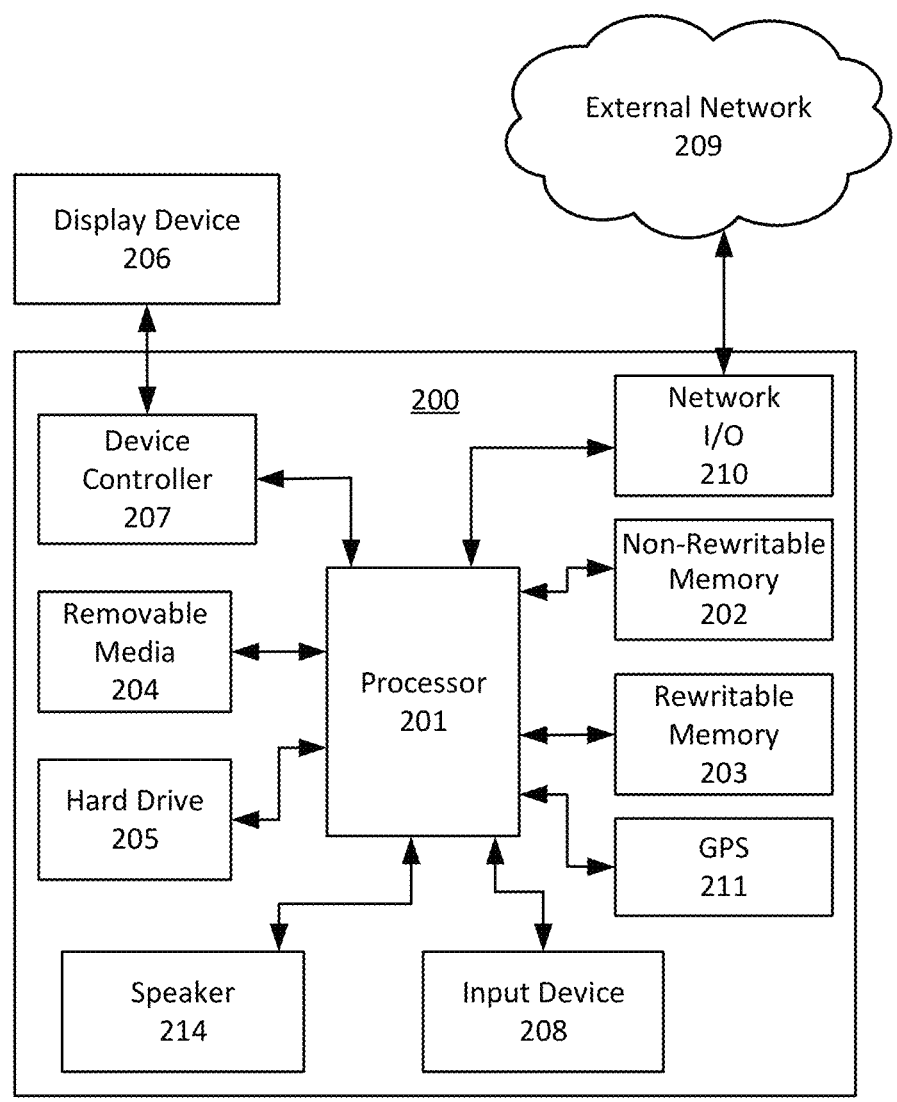
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., the user device 305, the content device 310, the user device 705, etc.). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
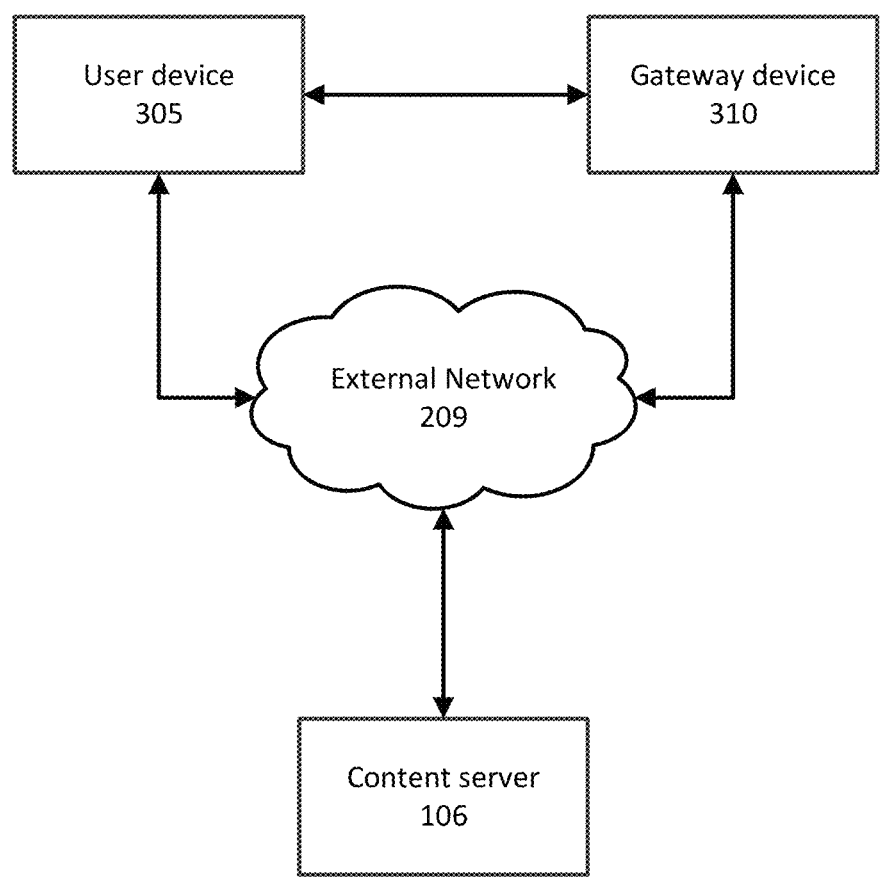
FIG. 3 shows an example system that may be used to protect content.

FIG. 3 shows an example system 300 that may be used for preventing and/or discouraging access by persons to a controlled type of content. One such type of a controlled content is content that is restricted to children or minors. Some content, such as restricted content, may be inappropriate for some users to consume (e.g., view, listen to, read, etc.). For example, an underage user of the system 300 may be considered too young to view an R rated movie. An adult user of the system 300 may wish to consume a content item and at the same time discourage and/or prevent an underage user (e.g., a user that satisfies an age threshold, a user that is below a particular age, etc.) from consuming the content item or a portion of the content item. The system 300 may be configured to detect whether an underage user is present in an environment (e.g., a room) where the content item is to be output and the system 300 may output deterrent audio together with the content item's audio. The deterrent audio may be audible to the underage user and may be inaudible to an adult user that is permitted to consume the content item. The audio may cause discomfort to the minor user and may cause the minor user to leave the environment where the content item is being output. By playing a sound that is audible to minor users and/or causes discomfort to minor users, but that is inaudible to adult users, the system may discourage and/or prevent minor users from consuming restricted content (e.g., explicit, graphic, content deemed to be inappropriate by a supervising user, etc.). The deterrent audio may allow an adult user to enjoy the content item without any disruptions that typical censors might cause (e.g., by bleeping out words, cutting scenes, etc.).

A sound may be audible to a younger user and inaudible to an older user if the sound is output at a sufficiently high frequency. The human ear comprises hair cells used to detect sound. As a person ages, hair cells may be destroyed and may make it harder for the person to hear sounds output at higher frequencies. For example, a person of any age may be able to hear a sound at or below 8,000 Hertz (Hz), a person under the age of 50 years may be able to hear a sound at or below 12,000 Hz, a person under the age of 40 years may be able to hear a sound at or below 15,000 Hz, a person under the age of 30 years may be able to hear a sound at or below 16,000 Hz, a person under the age of 24 years may be able to hear a sound at or below 17,000 Hz, and/or a person under the age of 20 years may be able to hear a sound at or below 19,000 Hz. Deterrent audio may be output at a high frequency (e.g., around 20,000 Hz) to deter younger users from consuming content. For example, the deterrent audio may be overlaid with the content audio. This may make it uncomfortable for a younger user of the system 300, who may be able to hear that deterrent audio, to remain in the environment where the content item is output but still allow older users, who may be unable to hear the deterrent audio, to consume a content item without experiencing discomfort caused by the deterrent audio.

The system 300 may comprise a user device 305, a gateway device 310, and the content server 106. The user device 305 and the gateway device 310 may be connected (e.g., via WiFi, Bluetooth, cable, etc.). The user device 305 may comprise one or more computing devices and/or other components (e.g., a display screen configured to output video, and/or speakers configured to output audio). For example, the user device 305 may comprise one or more of the mobile device 125, the other device 113, the personal computer 114, the laptop computer 115, the wireless device 116, and/or other computing devices. The user device 305 may comprise a display screen, television, tablet, smart phone, computer, streaming device, or any other device capable of outputting audio and/or video of a content item. The gateway device 310 may be configured to provide access to the Internet for the user device (e.g., via the external network 209). The gateway device 310 may comprise, for example, the interface 120, and/or the gateway 111. Additionally or alternatively, the user device 305 may be able to access the Internet without the assistance of the gateway device 310 (e.g., the user device 305 may access the Internet using 4G, Long-Term Evolution, 5G New Radio, or other communication method).

The user device 305 and the gateway device 310 may communicate with the content server 106 via the external network 209. The user device 305 may request a content item from the content server 106 and may output the content item to one or more users within an environment (e.g., a household, a living room, or any other location where one or more users are within hearing distance of the output content item). The user device 305 may be configured to output a deterrent audio (e.g., overlaid with audio of the content audio) to deter underage users from consuming content items or a portion of a content item. A deterrent audio overlaid with audio of the content item may, for example, comprise the audio (e.g., sound track) for the content item with the deterrent audio added to and/or superimposed on the audio for the content item. A user (e.g., a child) able to hear the deterrent audio may hear the audio for the content item and the deterrent audio. A user (e.g., an adult) unable to hear the deterrent audio may hear only the audio for the content item. The deterrent audio may be output to prevent a user from consuming controlled (e.g., restricted) content in the content item. The controlled content may be imagery (e.g., images with or without audio, video with or without audio, etc.). The deterrent audio may comprise output to prevent a user from viewing restricted imagery (e.g., explicit images, graphic images, images deemed to be inappropriate by a supervising user, etc.) and/or audio.

The user device 305 may store a plurality of audio files that enable the user device 305 to output sounds that are at a frequency (e.g., 20,000 Hz, 19,000 Hz, or any other frequency described above) that can be heard by underage users but that are inaudible to other users. The sound may be designed to cause discomfort to underage users and make it difficult for the underage user to remain in the environment where the content item is being output (and/or may make it difficult for the underage user to clearly hear the audio for the content item) and thus may discourage and/or prevent the underage user from consuming the content item (e.g., or a portion of the content item that comprises restricted content). If the gateway device 310 or other computing device is set to block certain channels/services unless a parental access code is entered, entry of that code may cause deterrent audio to be output for all content associated with that channel/service. One or more services/channels may be designated as channels for which deterrent audio should be output for all content received via those one or more services/channels.

The gateway device 310 may cause a content item to be output, in a premises (e.g., a living room, a house, a park, etc.), via the user device 305. The gateway device 310 (e.g., or other device 113) may determine whether the content item or a portion of the content item comprises restricted content. The gateway device 310 may add deterrent audio to the audio of the content item, for example, if restricted content is detected in the content item. Preventing and/or discouraging access is discussed in more detail in connection with FIGS. 4-9 below.

Figure 4:
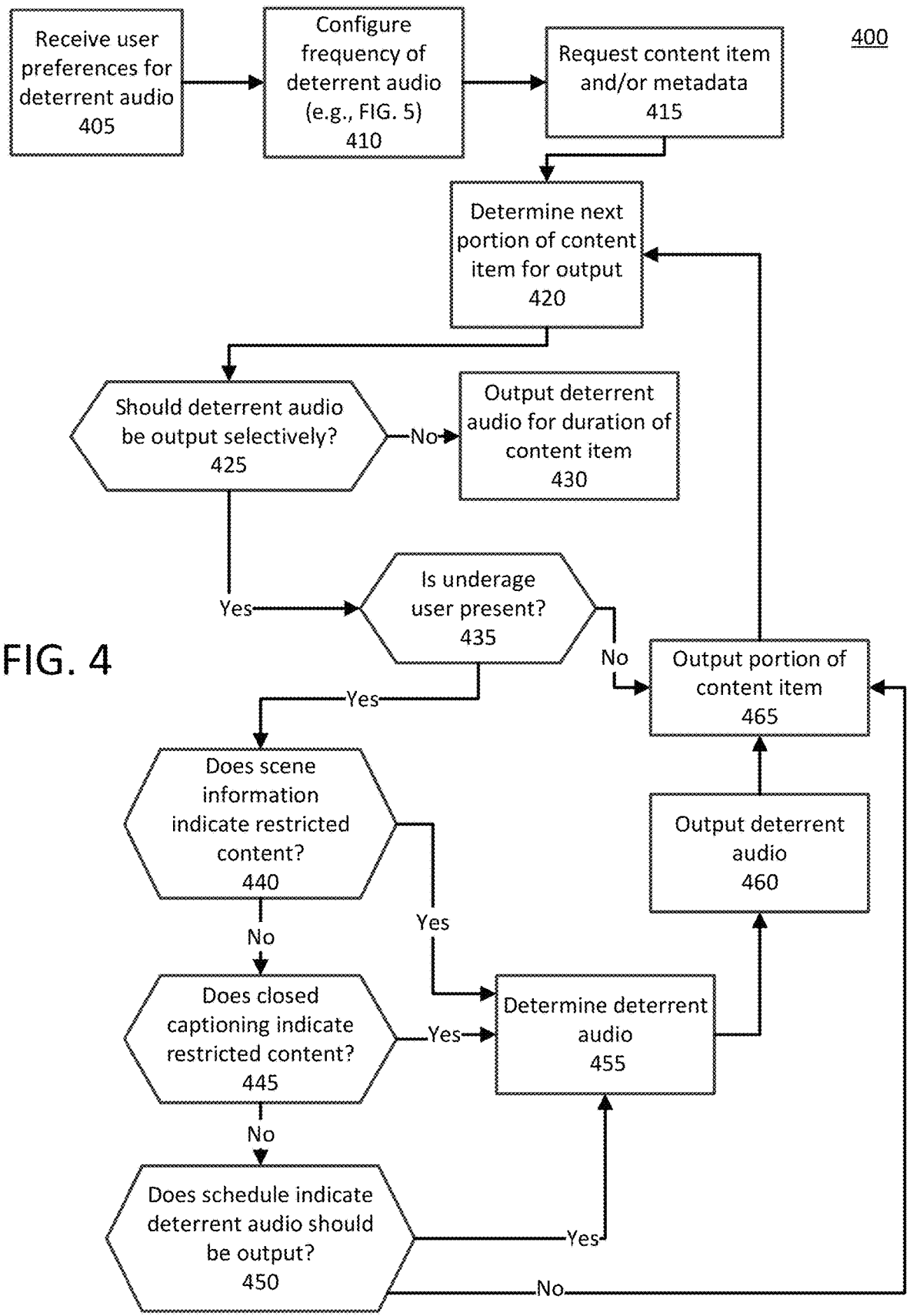
FIG. 4 is a flow chart showing an example method for content protection.

FIG. 4 shows an example method 400 for preventing and/or discouraging access by children and/or other persons to inappropriate content and/or other information. The example method 400 may be performed using any device described in connection with FIGS. 1-3. Although one or more steps of the example method 400 are described for convenience as being performed by the user device 305 and/or the content server 106, one, some, or all of such steps may be performed by the gateway device 310, or one or more other computing devices, and steps may be distributed among one or more computing devices, including any computing devices such as those described in connection with FIGS. 1-3. One or more steps of the example method 400 may be rearranged, modified, repeated, and/or omitted.

At step 405, user preferences for deterrent audio may be received (e.g., via one or more user interfaces such as described in connection with FIGS. 9A-9C). For example, a user (e.g., an administrator) may input the user's preferences into the user device 305. The user preferences may be set by an administrator (e.g., a parent) and underage users may be unable to change the preferences (e.g., the preferences may require a password to be changed). The preferences may indicate when or in what situations a deterrent audio (e.g., for deterring underage users from consuming a portion of a content item) should be output by the user device 305. The preferences may indicate one or more types of content that certain users (e.g., underage users) are allowed to consume and/or one or more types of content (e.g., restricted content) that those users are not allowed to consume. Restricted content may comprise one or more content types that have been designated as inappropriate for one or more groups of younger persons. Restricted content may comprise content types and/or content showing violence, content showing sexual activity, content showing nudity, content showing drug/alcohol/tobacco use, content comprising adult language (e.g., profanity) and/or other content. For example, the preferences may indicate that one underage user is allowed to consume content (e.g., or a content type) with swearing or other language, but is not allowed to consume content with graphic violence. For example, the user preferences may indicate that a particular user is not allowed to consume a content item that is rated above a threshold (e.g., the content item is rated at or above PG-13 and indicates that it comprises violent content). User preferences may indicate that a user is not allowed to consume content that is rated for an age that is older than the user's age. For example, if a user is 16 years old, the preferences may indicate that the user is not allowed to consume a content item that is rated TV-17. As an additional example, if a user is under the age of 13, the user preferences may indicate that the user is not allowed to view a content item that is rated PG-13.

At step 410, the frequency of the deterrent audio may be configured (e.g., via one or more user interfaces such as described in connection with FIGS. 9A-9C). Step 410 may comprise any step discussed in connection with FIG. 5 below. The deterrent audio may be configured separately for each user. For example, the deterrent audio may be configured for each user in a household and/or each user below an age threshold (e.g., 18 years, 16 years, etc.). For example, the user device 305 or content server 106 may determine that an appropriate frequency for the deterrent audio is 20,000 Hz for a user that is age 12 years and that an appropriate frequency for the deterrent audio is 19,000 Hz for a user that is age 16 years.

At step 415, a content item may be requested. The user device 305 may send a request, to the content server 106, for a content item. The request may be sent based on a selection made by a user. The content server 106 may send the requested content item to the user device 305 for output. At step 420, the user device 305 may determine the next portion of the content item requested in step 415 that should be output. For example, the user device 305 may generate a video stream comprising the content item and may begin by determining the first portion of the video stream for output in an environment. The next portion of the content item may be determined based on a segment of the content item that is identified by a manifest file. The manifest file may indicate locations of content data for segments (e.g., a 1 second segment, a 4 seconds segment, etc.) of the content item. The next portion of the content item may be determined based on an interval of time. For example, the content item may be split into portions that are four seconds long. The next portion may be the next four second portion of the content item.

At step 425, whether deterrent audio should be output selectively may be determined. Outputting the deterrent audio selectively may comprise outputting the deterrent audio during one or more portions of the content item. Outputting the deterrent audio selectively may comprise outputting the deterrent audio while restricted content is output and/or a threshold time prior to output of restricted content, but not when non-restricted content is output. For example, outputting the deterrent audio selectively may comprise outputting the deterrent audio during sex, violence, or other scenes of a 2 hour movie, but not during scenes that have no restricted content. Outputting deterrent audio for the duration of a content item may comprise continuously outputting the deterrent audio for the entire 2 hours of the movie. The user device 305 may determine whether the deterrent audio should be output selectively (e.g., throughout the duration of the content item or only during certain portions of the content item) based on user preferences. The user device may determine that deterrent audio should not be output selectively, for example, if the user that selected the content item has indicated in user preferences that the deterrent audio should be output throughout the duration of the content item. For example, a user may deem a content item too risky for an underage user to inadvertently see a portion of the content item and therefore may want the deterrent audio to be output for the entire duration of the content item.

Alternatively, the user device may determine that deterrent audio should not be output selectively, for example, if more than a threshold percentage (e.g., 60%, 30%, 20%, etc.) of the content item contains restricted content or material that may be inappropriate for an underage user.

Metadata for a content item may indicate the percentage of scenes that comprise restricted content. The user device 305 may compare the threshold percentage with the percentage indicated by the metadata to determine whether deterrent audio should be output for the duration of the content item. The user device 305 may determine that deterrent audio should be output for the duration of the content item, for example, if the percentage indicated in the metadata exceeds the threshold percentage. Alternatively, locations within the content item may be tagged with information indicating that the location comprises restricted content (e.g., metadata may comprise tags indicating locations of violence, sexual, language or other restricted content). The user device 305 may determine that deterrent audio should be output for the duration of the content item, for example, if the quantity of restricted content tags exceeds a threshold quantity (e.g., 2, 5, 10, etc.). Additionally or alternatively, the user device 305 may non-selectively add deterrent audio to the audio of an entire content item based on information such as rating (e.g., if R, MA, PG-13, NC-17, etc.) of the content item.

If it is not determined that the deterrent audio should be output selectively, step 430 may be performed, and the deterrent audio may be output for the duration of the content item (e.g., deterrent audio may be overlaid with all of the audio corresponding to the content item). Alternatively, the user device 305 may determine that deterrent audio should be output selectively, for example, if a user preference may indicates that deterrent audio should be output selectively. Step 435 may be performed, for example, if the user device 305 determines that deterrent audio should be output selectively.

At step 435, whether an underage user is present may be determined. Step 435 may be optionally performed. If step 435 is omitted, step 440 (described below) may be performed if it is determined in step 425 that deterrent audio should be selectively output. In step 435, the user device 305 may determine that an underage user is present, for example, if it is able to detect an underage user. The user device 305 may comprise one or more microphones (e.g., a microphone array) that are configured to receive voice audio from one or more users. The user device 305 may be configured to recognize voices in the voice audio and/or determine the age of a user based on the voice audio. The user device 305 may use the voice audio to determine an age of each user within an environment where the content item is being output. For example, the user device 305 may have access to a voice profile of each user in a household. The user device 305 may match voice data detected in the environment with one or more voice profiles to determine users present in the environment. A voice profile may indicate an age of a user and if the voice profile is determined to be a match with received voice audio, the user device 305 may determine that the user is present in the environment. Additionally or alternatively, the user device 305 may use a machine learning model to perform voice recognition to identify a user. An identified user may have an associated profile that indicates the age of the identified user. Alternatively, the user device 305 may use a machine learning model to determine the age of a detected voice. For example, the machine learning model may be trained to determine an age of a human based on voice audio received from the human (e.g., without matching the voice data to a profile).

The user device 305 may compare the age with user preferences (e.g., preferences of the user that selected the content item) and/or the content item to determine whether there is an underage user present in the environment. For example, if user preferences indicate that a user under the age of 15 is not permitted to consume violent content items, the user device determines that a 14-year-old user is present, and the content item requested in step 415 comprises one or more violent scenes, the user device may determine that an underage user is present. Additionally or alternatively, the user device 305 may compare the age of a user with a rating of the content item to determine whether there is an underage user in the environment. The user device 305 may determine that there is an underage user present, for example, if there is a user determined to be under the age of 17 and the content item has an R rating.

Additionally or alternatively, the user device 305 may use WiFi disruption to determine whether an underage user is present. The user device 305, the gateway device 310, and/or one or more other computing devices may be configured to detect radio waves (e.g., WiFi) and may detect locations of one or more users based on radio waves reflected off of the one or more user's bodies. Each user may have their own user profile (e.g., an indication of how radio waves reflect off the user's body) that may be identifiable by the user device 305 and/or the gateway device 310. Each user profile may indicate the age of a user. The user device 305 and/or gateway device 310 may determine that an underage user is present if the profile of a user below a threshold age (e.g., 18 years, 13, years, etc.) is detected within a threshold distance of the user device and/or gateway device 310. Additionally or alternatively, infrared sensors or emitters may be used to determine an underage user based on an infrared profile of a user. Additionally or alternatively, the user device 305 and/or gateway device 310 may determine an age of a user based on the size of the user. The user's size may be determined based on the reflection of radio waves from the user's body. The user device 305 and/or gateway device 310 may determine that an underage user is present if the size of a user is below a threshold size (e.g., below 5 feet, less than 100 pounds, etc.). Additionally or alternatively, the user device 305 may comprise one or more infrared sensors and the one or more infrared sensors may be used to determine whether an underage user is present. The user device 305 may use an infrared sensor to determine the temperature of each user that is nearby the user device 305. Users of different ages may have different temperatures and younger users may tend to have higher body temperatures. For example, a user between the ages of 0-3 years may have a temperature of 97.5-100.4 degrees Fahrenheit, a user between the ages of 3-10 years may have a temperature of 97.0-100.0 degrees Fahrenheit, and a user between the ages of 11-65 years may have a temperature of 96.6-99.7 degrees Fahrenheit. The user device may determine that the user is underage and that an underage user is present, for example, if a temperature determined for a user is above a threshold temperature (e.g., above 99.7 degrees Fahrenheit).

Additionally or alternatively, the user device 305 may use detection zones to determine whether an underage user is present. The user device 305 may comprise a motion detector or a camera (or otherwise may be configured to communicate with a motion detector or a camera) that is able to detect whether a person is in a particular location (e.g., a detection zone) or has moved through a particular location. A user may use (e.g., via a user interface) the user device 305 to indicate a detection zone (or multiple detection zones). For example, the user may indicate that the doorway to a room where the user device is located should be a detection zone. The user device 305 may determine that an underage user is present if an object is present in or near the doorway (e.g., the detection zone indicated by the user). For example, a child may be watching the user device 305 from the doorway while the child's parents are watching a movie. The user device 305 may use one or more machine learning models (e.g., a convolutional neural network, etc.) to determine whether a person in the detection zone is underage. For example, a machine learning model may be trained using a dataset comprising images labeled as adults and images labeled as children. Based on the training, the machine learning model may be able to distinguish a user as underage or not. The user device 305 may record one or more images (e.g., an image, three images, video, etc.) of the detection zone and may use the one or more images as input into the machine learning model. The user device may determine that an underage user is present, for example, if the model indicates that an underage user (e.g., a child) is present in the detection zone.

If it is determined that no underage user is present, step 465 may be performed and the next portion of the content item (e.g., determined in step 420) may be output. If an underage user is determined to be present, step 440 may be performed. At step 440, whether the scene information corresponding to the content item indicates that the next portion determined in step 420 comprises restricted content may be determined. The content item may comprise information about one or more portions or scenes of the content item. The information may indicate what occurs during the portion of the content item. The information may indicate whether the portion contains any restricted content. For example, information may indicate that the portion comprises violence, sexual, language, or other restricted content. Each portion of the content item may be tagged with information indicating whether the portion comprises any restricted content and/or the type of restricted content that the portion comprises. For example, each portion of content item (e.g., 1 second portions identified by a manifest) may have a corresponding metadata file that includes markers/tags/other indications of content type applicable to that content item portion. The metadata may comprise closed captioning data, insertion triggers, and/or other data indicating restricted content. Metadata for each portion may be examined and compared against types of restricted content and/or user preferences received in step 405. The user device 305 may determine that the next portion comprises restricted content, for example, if there is a match between the metadata and the user preferences (e.g., the metadata indicates that the next portion comprises sexual content and the user preferences indicate that sexual content is restricted content). The metadata may indicate multiple restricted content types applicable to a single portion of content. For example, the metadata may indicate that a portion comprises violent content and inappropriate language. By indicating multiple types of restricted content for a single portion, deterrent audio may be output during that single portion if any of one of the multiple restricted content types is designated by user preferences (e.g., as received in step 405).

Step 455 may be performed, for example, if the user device 305 determines that scene information corresponding to the next portion (e.g., determined in step 420) indicates that the next portion comprises restricted content. Step 445 may be performed, for example, if the user device 305 determines that the scene information does not indicate that the next portion comprises restricted content.

At step 445, whether closed captioning corresponding to the next portion indicates that the next portion comprises restricted content may be determined. Some content items may not have scene information indicating locations or portions of the content item that comprise restricted content. Instead of or in addition to using scene information, the user device 305 may determine locations with restricted content based on the closed captioning of the content item. For example, the user device 305 may determine that closed captioning for the next portion comprises gunshots or explosions and may determine that the next portion comprises restricted content that is violent. The user device 305 may analyze the words in the closed captioning and compare the words with a list of words that are deemed restricted (e.g., as may be indicated by user preferences). The user device 305 may determine that the closed captioning indicates that the next portion comprises restricted content, for example, if a word in the closed captioning matches a word in the list of restricted content words. If the user device 305 determines that that closed captioning indicates that the portion comprises restricted content, step 455 may be performed. Alternatively, step 450 may be performed.

At step 450, whether schedule information indicates that deterrent audio should be output may be determined. The user device 305 may have access to a user's schedule information. The schedule information may indicate one or more times when the user is permitted to consume a content item. For example, a user that is a student may be permitted to consume content items during only certain times of the day such as after 7 pm. The user device 305 may compare the schedule information with the current time to determine whether a deterrent audio should be output. For example, if it is 5 pm and the schedule, for a user within hearing range of the user device 305, indicates that content items may only be consumed after 7 pm, the user device may determine that deterrent audio should be output. The deterrent audio may be output to discourage and/or prevent the user from consuming content outside of times designated by the user's schedule (e.g., to encourage the user to complete homework before 7 pm). Step 455 may be performed, for example, if schedule information indicates that deterrent audio should be output. Otherwise, step 465 may be performed.

At step 455, a deterrent audio may be determined. The deterrent audio may be determined based on users present in the environment and which users should be deterred from the environment. Determining a deterrent audio may comprise determining a frequency of the deterrent audio. A frequency may be determined such that the deterrent audio will deter only users that are not permitted to consume the content (e.g., because the users are underage users and/or because a schedule of a user does not permit the user to consume the portion of the content item). The frequency may be such that users that are permitted to consume the portion of the content item will not be able to hear the deterrent audio. For example, there may be a 7-year-old user, a 12-year-old user, a 16-year-old user, and a 23-year-old user in an environment where the content item is being output. User preferences may indicate that the 7-year-old and the 12-year-old user are not permitted to consume the content item. The user device 305 may determine that a frequency of 21,000 Hz may be heard by the 12-year-old user and the 7-year-old user, but not by the 16-year-old user or the 23-year-old user. Additionally or alternatively, determining the deterrent audio may comprise determining a volume level of the deterrent audio. A volume level of the deterrent audio may be determined based on the severity of the restricted content. For example, deterrent audio for a portion of a content item comprising mild language may have a lower volume level, whereas deterrent audio for a portion of a content item comprising graphic violence may have higher volume level. The deterrent audio may be a continuous tone or a non-continuous tone that is output at the determined frequency. The deterrent audio may have the same intensity (e.g., volume level) as the audio of the content item, or some percentage (e.g., 50%, 75%, 150%, 300%, etc.) of the intensity of the audio of the content item.

At step 460, the deterrent audio determined in step 455 may be output. The deterrent audio may be output within a threshold quantity of time (e.g., 10 seconds, 30 seconds, 1 minute, etc.) prior to output of the next portion determined in step 420. The deterrent audio may be output prior to the output of the portion of the content so that there is enough time to cause an underage user to leave the environment where the content item is being output. The deterrent audio may be output for a minimum amount of time (e.g., as indicated by user preferences). For example, the deterrent audio may be output for 1 minute, 3 minutes, 10 minutes or some other minimum quantity of time. Additionally or alternatively, the deterrent audio may be output during the entire duration of the next portion of the content item. This may discourage and/or prevent an underage user from returning to the environment at a time when restricted content is being output. The deterrent audio may be stored on the user device 305. Alternatively, a manifest file corresponding to the content item may indicate a location (e.g., a Uniform Resource Identifier) of the deterrent audio.

At step 465, the next portion determined in step 420 may be output in the environment. The output may comprise video and/or audio output. Steps 420-465 may be repeated multiple times (e.g., until the content item has finished, the user has turned off the content item, or started consuming a different content item).

Figure 5:
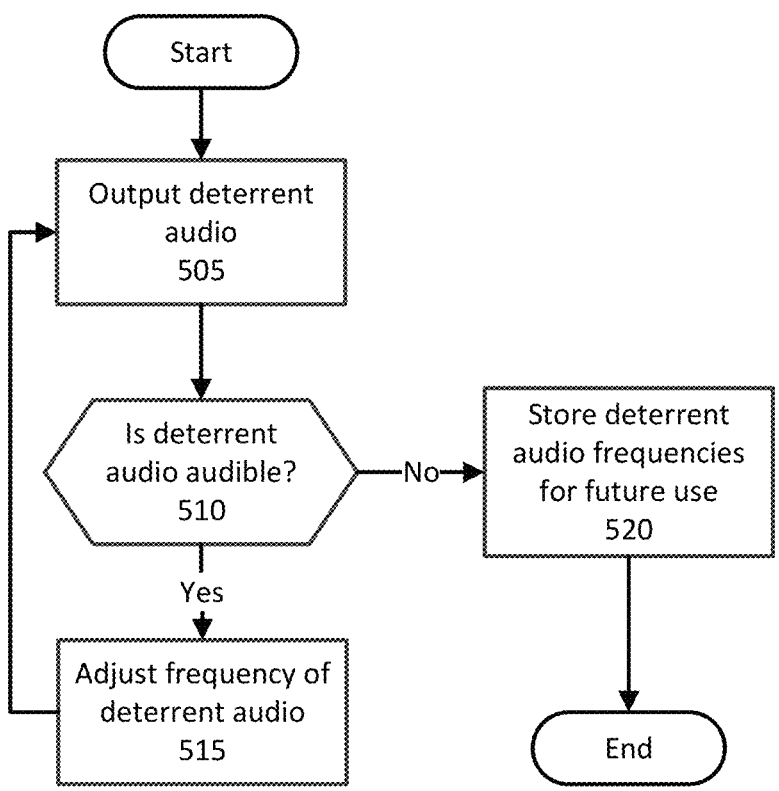
FIG. 5 is a flow chart showing an example method for configuring the frequency of deterrent audio.

FIG. 5 shows an example method 500 for configuring deterrent audio. The method may be performed multiple times (e.g., once for each user in a household) to determine an appropriate frequency for each user in an environment. The method 500 may comprise outputting a deterrent audio, receiving feedback from a user, and adjusting the frequency until the user is unable to hear the deterrent audio. A computing device (e.g., the user device 305) may be able to determine at what frequency a deterrent audio can be output so that the user is not bothered by the deterrent audio. That computing device may also determine which frequency can be used to deter the user and/or other users from consuming a content item. Although one or more steps of the example method 500 are described for convenience as being performed by the user device 305 and/or the content server 106, one, some, or all of such steps may be performed by one or more other computing devices, and steps may be distributed among one or more computing devices, such as those described in connection with FIGS. 1-4. One or more steps of the example method 500 may be rearranged, modified, repeated, and/or omitted. The example method 500 may be performed as part of step 410 of FIG. 4.

At step 505, a deterrent audio may be output to a user. The deterrent audio may start at a low frequency that any user may be expected to be able to hear (e.g., 8,000 Hz). At step 510, whether the deterrent audio is audible to the user may be determined. For example, the user may input an indication via the user device 305 that the deterrent audio is audible. Step 520 may be performed, for example, if the deterrent audio is not audible. Step 515 may be performed, for example, if the deterrent audio is audible.

At step 515, the frequency of the deterrent audio may be adjusted. The user device 305 may increase the frequency, for example, if the user was able to hear the deterrent audio (e.g., in step 510). The frequency may be increased by a threshold amount (e.g., 100, Hz, 500 Hz, 1000 Hz, etc.). Step 505 may be repeated, for example, using the adjusted frequency as the frequency for the deterrent audio. Steps 505-515 may be repeated until the frequency is adjusted high enough so that the user is unable to hear the deterrent audio. Step 520 may be performed for example, if it is determined that the deterrent audio is not audible in step 510. At step 520, the frequency of the deterrent audio may be stored (e.g., in the user device 305, at the content server 106, or other database) and may be used to deter people (e.g., underage users) from consuming content that the user is consuming. Additionally or alternatively, the user device 305 may store the frequency that is just below the frequency that was not audible to the user in step 510. For example, a user may be able to hear the deterrent audio if the frequency is 14,000 Hz (e.g., as determined in step 510). At step 515, the user device may adjust the frequency to 14,500 Hz and the next time step 510 is performed, the user may be unable to hear the deterrent audio. The user device 305 may store both the 14,000 Hz frequency and the 14,5000 Hz frequency for later use. The user device 305 may determine that the 14,000 Hz frequency may be used to deter the particular user from consuming a content item. Additionally or alternatively, the user device 305 may determine that the 14,500 Hz frequency may be used, for example, if the user has selected a content item, to deter other users from consuming the content item. One or more computing devices (e.g., the user device 305) may store data linking determined frequencies with particular users (e.g., user identifiers) and/or ages of those particular users.

Figure 6:
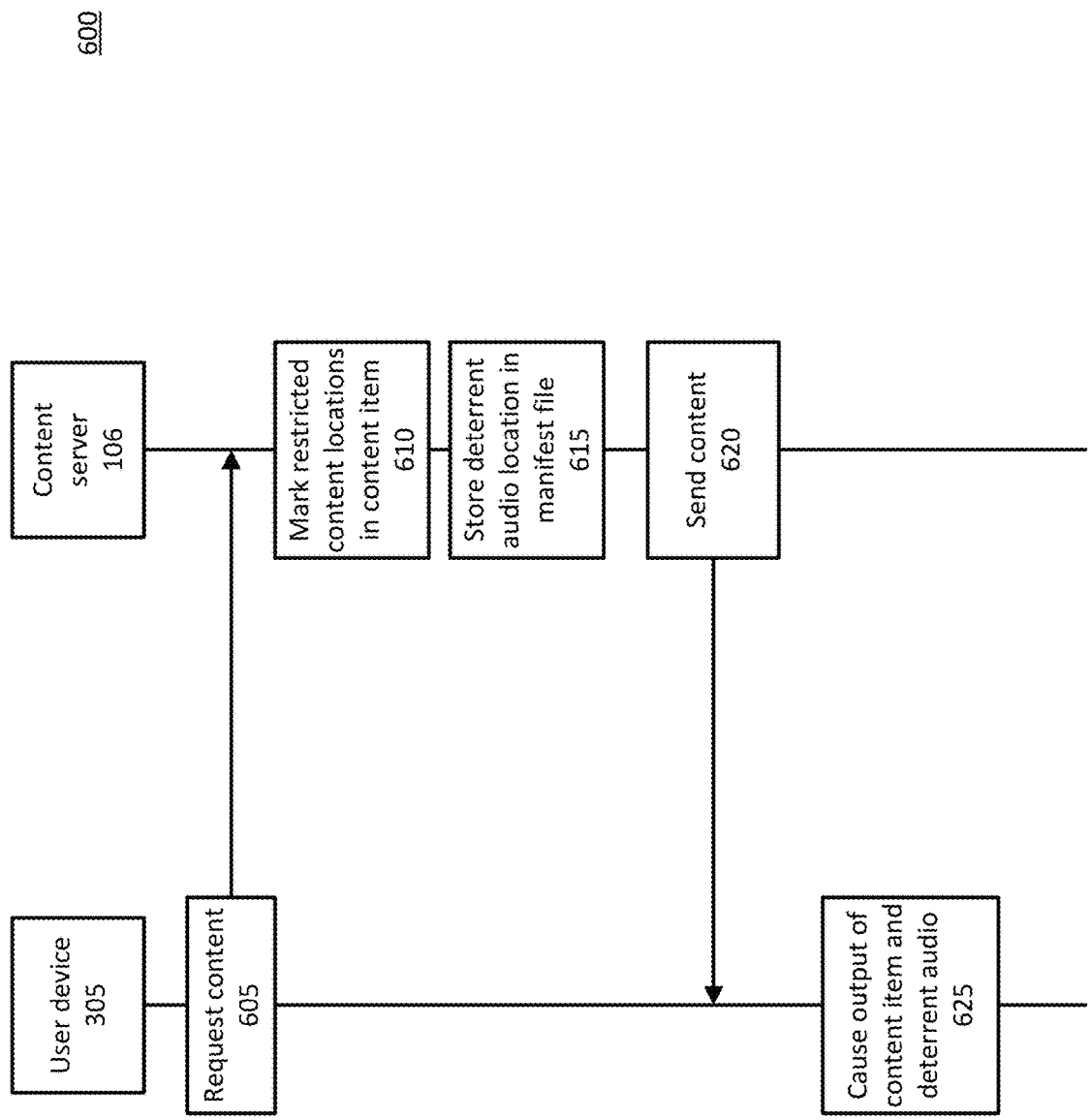
FIG. 6 is a sequence diagram showing an example method for content protection.

FIG. 6 shows an example method 600 for preventing and/or discouraging access by children and/or other persons to inappropriate content and/or other information. Although one or more steps of the example method 600 are described for convenience as being performed by the user device 305 and/or the content server 106, one, some, or all of such steps may be performed by one or more other computing devices, and steps may be distributed among one or more computing devices, including any computing devices such as those described in connection with FIGS. 1-5. One or more steps of the example method 600 may be rearranged, modified, repeated, and/or omitted.

At step 605, the user device 305 may send a request for a content item to the content server 106. The request may be sent as described above in connection with step 415 of FIG. 4. At step 610, the content server 106 may mark restricted content locations in the requested content item. The content server 106 may insert tags into a manifest file of the content item. A tag may indicate what occurs in a corresponding scene or portion of the content item. For example, the tag may indicate that the portion comprises restricted language, violence, sexual content, or other restricted content.

At step 615, the content server 106 may store a location (e.g., a Uniform Resource Locator) of a deterrent audio in a manifest file for the content item. Alternatively, the functions of step 615 may be performed elsewhere in the process, for example, at a packager or player. At step 620, the content server may send the content item to the user device 305. The content item may comprise video, primary audio, secondary audio, and/or metadata. The metadata may comprise a rating of the content item, closed captioning, and/or insertion triggering (e.g., for placement of advertisements). The content item may comprise a manifest file that indicates a location of a deterrent audio file. At step 625, the user device 305 may cause output of the deterrent audio (e.g., as described above in connection with step 460 of FIG. 4 above) and/or the content item or a portion of the content item (e.g., as described above in connection with step 465 of FIG. 4).

Figure 7:
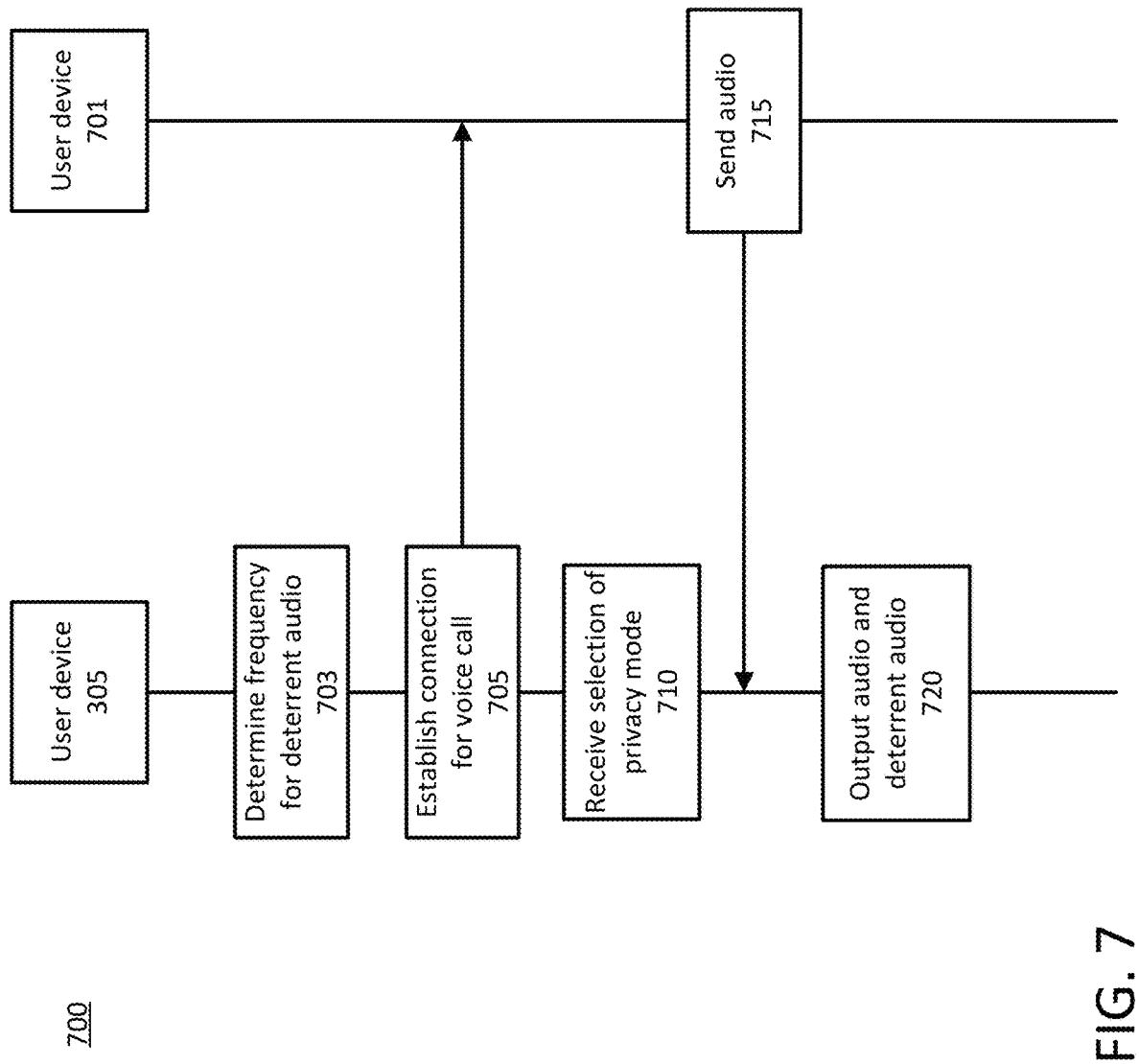
FIG. 7 is a sequence diagram showing an example method for protecting voice calls.

FIG. 7 shows an example method 700 for preventing and/or discouraging access by children and/or other persons to inappropriate content and/or other information. Although one or more steps of the example method 700 are described for convenience as being performed by the user device 305 and/or the user device 701 (e.g., the user device 701 may comprise one or more of the mobile device 125, the other computing device 113, the personal computer 114, the laptop computer 115, the wireless device 116, and/or other computing devices), one, some, or all of such steps may be performed by one or more other computing devices, and steps may be distributed among one or more computing devices, including any computing devices such as those described in connection with FIGS. 1-6. One or more steps of the example method 700 may be rearranged, modified, repeated, and/or omitted.

At step 703, the user device 305 may determine a frequency for deterrent audio. The frequency may be determined for a specific user of the user device 305. For example, if the user device 305 is a smart phone, the frequency may be determined for the owner of the smart phone. The frequency may be determined as described above in connection with FIG. 5. At step 705, the user device 305 may establish a connection with the user device 701 for a voice call. The voice call may comprise a phone call, a video conference or chat, or other exchange of audio between the user device 305 and the user device 701.

At step 710 the user device 305 may receive a selection of a privacy mode setting. For example, a user of the user device 305 may input a selection of a privacy mode on the user device 305. The privacy mode may be selected because the user wants to discourage and/or prevent one or more other users from listening to a conversation in which the user is engaged. At step 715, the user device 701 may send audio to the user device 305 (e.g., the audio may comprise a portion of a conversation). At step 720, the user device 305 may output the audio sent in step 715 and deterrent audio. The deterrent audio may be output at the frequency determined in step 703. For example, an adult user may be engaged in a conversation, via the user device 305 and via the user device 701, with the adult user's spouse. The adult user's children may be nearby, and the adult user may not want them to hear a portion of the conversation. After receiving selection of a privacy mode setting on the user device 305, the user device 305 may cause a deterrent audio that is customized to the adult user (e.g., the adult user may be unable to hear the deterrent audio, and any user younger or with better hearing than the adult user may be able to hear the deterrent audio) may be output by the user device 305. The deterrent audio may be unpleasant to the adult user's children and may cause them to move away from the user device 305 and/or discourage and/or prevent them from hearing the portion of the conversation.

Figure 8:
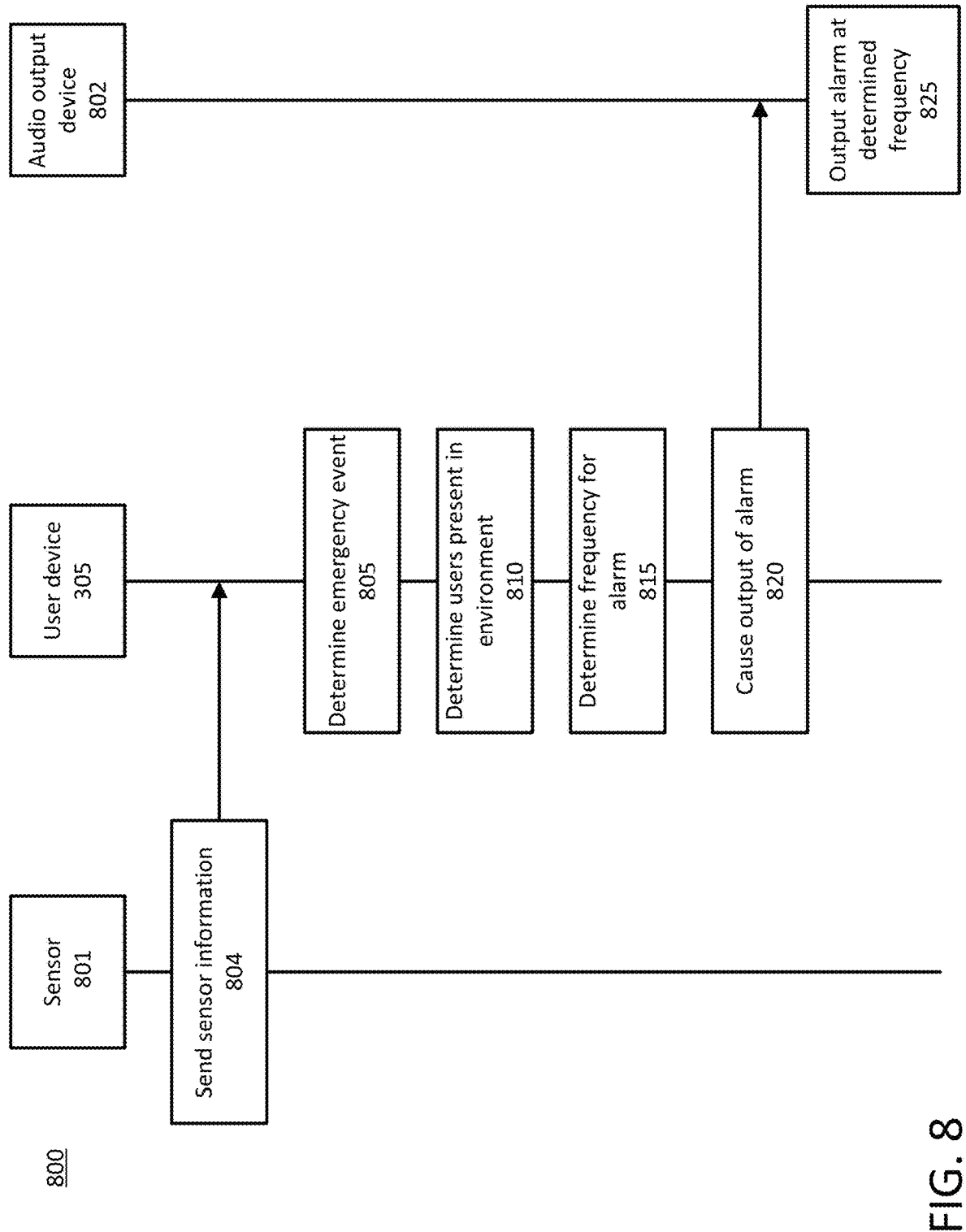
FIG. 8 is a sequence diagram showing an example method for preventing panic during an emergency.

FIG. 8 shows an example method 800 for avoiding panic during an emergency. Some environments such as senior centers, nursing homes, memory care units, or other locations may have large numbers of older users. These environments may also have one or more younger users or caretakers (e.g., nurses, assistants, chefs, janitors, or other workers). With typical alarm systems (e.g., that play loud sounds for everyone to hear), older users in the environment may become distressed and may panic. This may make it more difficult for caretakers to assist the older users in addressing the emergency event (e.g., evacuating the environment). Instead of a traditional alarm, a high frequency alarm may be used to notify caretakers of an emergency event. The high frequency alarm may allow the caretakers to hear the alarm, and the older users may be unable to hear the alarm. This may allow the caretakers to address the emergency event without potential interference from panicked older users. Although one or more steps of the example method 800 are described for convenience as being performed by the user device 305, the sensor 801, and/or the audio output device 802, one, some, or all of such steps may be performed by one or more other computing devices, and steps may be distributed among one or more computing devices, including any computing devices such as those described in connection with FIGS. 1-7. One or more steps of the example method 800 may be rearranged, modified, repeated, and/or omitted.

At step 804, sensor information may be sent by the sensor 801 to the user device 305. The sensor 801 may comprise a camera, a door sensor, a window sensor, a motion detector, a flood sensor, a smoke detector a carbon monoxide detector, gas leak sensors, or any other type of sensor. The sensor information may indicate whether the sensor 801 has detected an emergency event. The one or more sensors may send information to the user device 305, for example, if an emergency event is detected. The information may indicate the type of emergency (e.g., break-in, someone has escaped, etc.).

At step 805, an emergency event may be determined. An emergency event may comprise a break-in, fire, flood, or movement of any type of object including people and animals (e.g., an emergency event may include a user leaving an area that the user is not permitted to leave), a gas leak or any other type of event. The emergency event may comprise a health emergency (e.g., a user is unconscious, having trouble breathing, has a stroke, heart attack or other health emergency). The user device 305 may be communicatively coupled with the sensor 801 and may receive the sensor information sent in step 804. The user device 305 may analyze the sensor information to confirm whether an emergency event has been detected.

At step 810, the user device 305 may determine users present in the environment associated with the emergency event. The user device 305 may determine users present in the environment as described in connection with step 435 of FIG. 4. The user device 305 may detect voice audio corresponding to each user in the environment and may use the voice audio to identify each user. Alternatively, the user device 305 may use the voice audio to determine an approximate age of each user in the environment.

At step 815, a frequency for an alarm may be determined. The user device 305 may determine a frequency that is inaudible to older users within the environment but audible to caretakers in the environment. For example, if a threshold percentage of the caretakers are below the age of 60 and a threshold percentage of the older users are above the age of 80 years, the user device 305 may determine a frequency of 11,000 Hz. Alternatively, the user device 305 may assume that the caretakers are below an age threshold (e.g., 50, 65, 70, etc.) and may determine a frequency that is expected to be able to be heard by people of the threshold age and younger (e.g., 12,000 Hz if the threshold age is 50).

At step 820, the user device 305 may cause output of an alarm. The user device 305 may send information to the audio output device 802 to cause output of the alarm. For example, the information may indicate the emergency event determined in step 805 and/or the frequency determined in step 815. At step 825, the audio output device 802 may output an alarm at the frequency determined in step 815. Audio corresponding to the alarm may comprise a description of the emergency event. For example, the audio may comprise an indication that a particular door was opened, a fire has been detected, or other information corresponding to the emergency event.

Figure 9A:
Figure 9A:
Figure 9A:
Figure 9A:
Figure 9B:

FIGS. 9A-9C show example user interfaces for configuring deterrent audio. The example user interfaces may be used in connection with the method of FIG. 4 (e.g., step 410) or any other aspect described in connection with FIGS. 3-8. Referring to FIG. 9A, the user field 905 may indicate a particular user for whom one or more deterrent audio settings may apply. The settings shown in fields 915-940 may be applied by a computing device (e.g., the user device 305 or the gateway device 310), for example, if indicated by the enable deterrent audio field 910 (e.g., if the enable deterrent audio field 910 is checked) and/or if the user indicated by the user field 905 is detected by the computing device (e.g., as described in connection with step 435 of FIG. 4). The user device 305 may cause output of deterrent audio, for example, if violent content is about to be output by the user device 305, the violence field 915 is checked, and the user indicated by the user field 905 is detected by the user device 305. In a similar manner, a user may specify that deterrent audio should be output for sexual content and/or language if the corresponding sexual content field 920 and/or the language field 925 is checked. The rating field 930 may indicate that deterrent audio should be output, for example, if a content item is at or above a particular rating and the user indicated by the user field 905 is detected (e.g., the user is nearby or within hearing distance of the computing device). For example, a user (e.g., a parent or supervisor of the user indicated in the user field 905) may set the rating field 930 to PG-13 or higher. Based on this setting, the computing device may output deterrent audio, for example, if a content item rated at PG-13 or higher (e.g., TV-17, R, etc.) is being output and the user indicated by the user field 905 is detected by the computing device (e.g., the computing device detects that the user is nearby, the computing device receives audio corresponding to the user's voice, etc.). The services/channels field 935 may indicate services and/or channels for which deterrent audio should be output (e.g., if the user indicated in the user field 905 is detected while a content item from an indicated service and/or channel is being output).

Referring to FIG. 9B, a user (e.g., a parent or supervisor of the user indicated by the user field 905) may set a deterrent audio schedule 940 for the user indicated in the user field 905. The schedule 940 may indicate when deterrent audio should be output for the user indicated in the user field 905. For example, the deterrent audio may be output at particular times of the day if a content item is being output. This may discourage the user indicated in the user field 905 from consuming the content item and may encourage the user to perform other tasks (e.g., homework, exercise, reading, etc.). For example, the schedule 940 may indicate that deterrent audio should be output to discourage the user indicated in the user field 905 from consuming a content item before 7 pm on weekdays and between 9 am and 7 pm on weekends.

Referring to FIG. 9C, a user (e.g., a parent or supervisor of the user indicated by the user field 905) may adjust the frequency of the deterrent audio for the user indicated in the user field 905. A sliding bar 950 may be used to adjust the frequency of the deterrent audio that is output by the user device 305. The user device 305 may output deterrent audio at the adjusted frequency, for example, if the user indicated in the user field 905 is detected and one or more other settings or user preferences indicates that the deterrent audio should be output (e.g., as described above in connection with FIGS. 3-8).

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A system comprising:
a first computing device and a second computing device, wherein the first computing device is configured to:
receive a stream comprising a content item and metadata associated with the content item;
determine that the metadata comprises an indication that at least a portion of the content item comprises a restricted content type;
detect, based on voice input received via a microphone, presence of a child in an environment associated with the first computing device; and
cause, based on the indication and the presence of the child, and during output of the at least the portion of the content item, output of deterrent audio at a volume level corresponding to a severity of the restricted content type; and
wherein the second computing device is configured to:
send the stream to the first computing device.

2. The system of claim 1, wherein the deterrent audio comprises a frequency of at least 19,000 hertz.

3. The system of claim 1, wherein the first computing device is configured to cause output by causing, before and during an entirety of the at least the portion of the content item, output of the deterrent audio.

4. The system of claim 1, wherein the first computing device is further configured to:
determine, based on user preferences associated with the first computing device, a period of time to output the deterrent audio; and
cause output by causing output of the deterrent audio for the period of time.

5. The system of claim 1, wherein the indication comprises one or more of: closed captioning associated with the content item, content ratings associated with the content item, or a content tag associated with the content item.

6. The system of claim 1, wherein the at least a portion comprises less than all of the content item, and the first computing device is further configured to discontinue deterrent audio during one or more other portions not comprising the restricted content type.

7. The system of claim 1, wherein the first computing device is further configured to:
determine, based on schedule information corresponding to the child, that the child is not permitted to view the content item; and
cause output of the deterrent audio by causing output based on the determining that the child is not permitted to view the content item.

8. The system of claim 1, wherein the first computing device is further configured to:

determine, based on the presence of the child in the environment associated with the first computing device, a frequency of the deterrent audio that is inaudible to the child.

9. The system of claim 1, wherein the first computing device is configured to detect the presence of the child by comparing the voice input with a voice profile associated with the child.

10. The system of claim 1, wherein the first computing device is configured to detect the presence of the child further based on using a machine learning model to determine age of the child.

11. A method comprising:
receiving, by a computing device, a stream comprising a content item and metadata associated with the content item;
determining that the metadata comprises an indication that at least a portion of the content item comprises a restricted content type;
detecting, based on voice input received via a microphone, presence of a child in an environment associated with the computing device; and
causing, based on the indication and the presence of the child, and during output of the at least the portion of the content item, output of deterrent audio at a volume level corresponding to a severity of the restricted content type.

12. The method of claim 11, wherein the determining comprises comparing closed captioning words associated with the content item with a list of restricted content words.

13. The method of claim 11, wherein the deterrent audio comprises audio at a frequency of at least 19,000 hertz.

14. The method of claim 11, wherein the causing output comprises causing, before and during an entirety of the at least the portion of the content item, output of the deterrent audio.

15. The method of claim 11, further comprising:
determining, based on the presence of the child in the environment associated with the computing device, a frequency of the deterrent audio that is inaudible to the child.

16. The method of claim 11, further comprising:
determining, based on user preferences associated with the computing device, a period of time to output the deterrent audio, wherein the causing output comprises causing output of the deterrent audio for the period of time.

17. A method comprising:
outputting, by a computing device, a content item;
determining, by the computing device, an indicator that a portion of the content item comprises a controlled type of content;
detecting, based on voice input received via a microphone, presence of a child in an environment associated with the computing device; and
causing, based on the determining and the presence of the child, output of a deterrent audio during output of at least the portion of the content item, wherein the deterrent audio comprises a frequency of at least 19,000 hertz and is output at a volume level corresponding to a severity of the controlled type of content.

18. The method of claim 17, wherein the controlled type of content comprises one or more of: violent content, sexual content, content comprising nudity, or content with adult language.

19. The method of claim 17, wherein the causing output comprises causing, before and during an entirety of the at least the portion of the content item, output of the deterrent audio.

20. The method of claim 17, further comprising receiving a stream comprising the content item and metadata indicating locations of controlled types of content in the content item, and wherein the determining comprises determining based on the metadata.

21. The method of claim 17, wherein the at least a portion comprises less than all of the content item, and the method further comprising discontinuing deterrent audio during one or more other portions not comprising a controlled content type.

* * * * *

UNITED STATES PATENT AND TRADEMARK OFFICE
CERTIFICATE OF CORRECTION

| | |
|---|---|
| PATENT NO. | : 11,653,059 B2 |
| APPLICATION NO. | : 17/148916 |
| DATED | : May 16, 2023 |
| INVENTOR(S) | : Kirkovich et al. |

It is certified that error appears in the above-identified patent and that said Letters Patent is hereby corrected as shown below:

In the Specification

Column 4, Detailed Description, Line 21:
Delete "content" and insert --gateway-- therefor Column 4, Detailed Description, Line 22:
Delete "705," and insert --701,-- therefor Signed and Sealed this
Sixth Day of August, 2024

Katherine Kelly Vidal
*Director of the United States Patent and Trademark Office*